July 5, 1949.  J. R. CONNELLY ET AL  2,474,828
OPTICAL METHOD AND APPARATUS FOR MEASURING
THE ACCURACY OF FIREARMS
Filed May 16, 1946
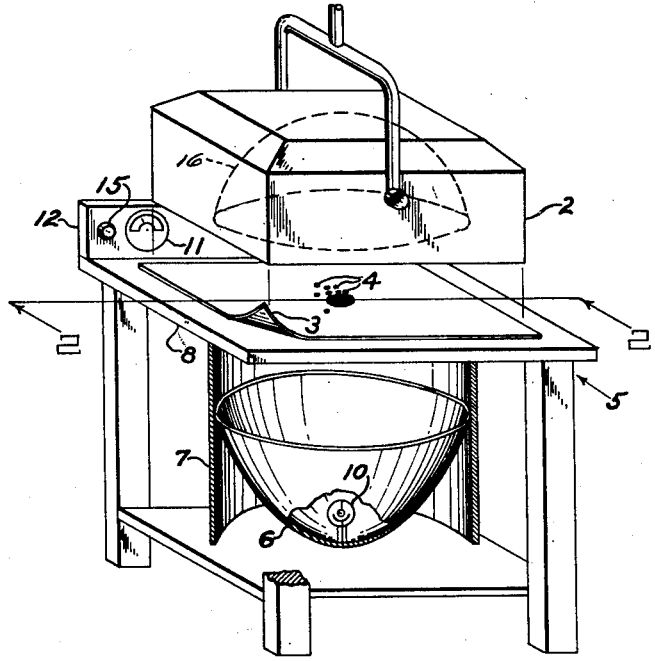
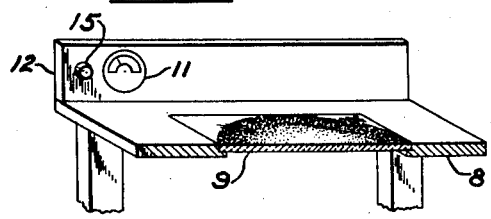
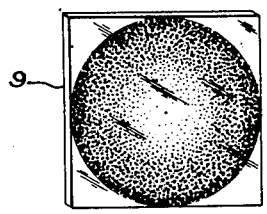
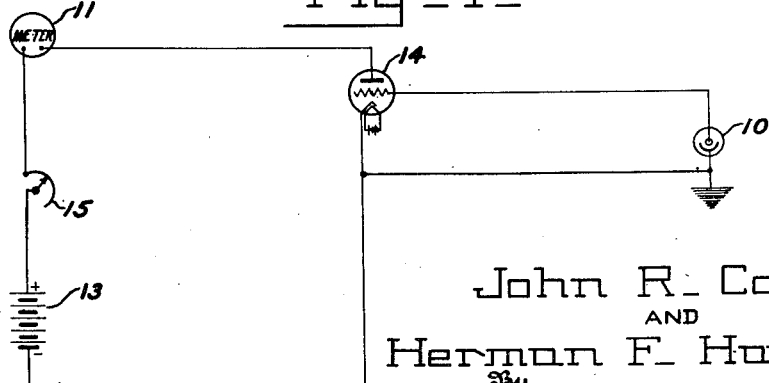
Inventors
John R. Connelly
AND
Herman F. Hawthorne
By J. H. Church & H. E. Thibodeau
Attorneys Patented July 5, 1949

2,474,828

UNITED STATES PATENT OFFICE 2,474,828

OPTICAL METHOD AND APPARATUS FOR MEASURING THE ACCURACY OF FIREARMS

John R. Connelly, Springfield, and Herman F. Hawthorne, Wilbraham, Mass.

Application May 16, 1946, Serial No. 670,088

7 Claims. (Cl. 88—14)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to methods and devices for measuring the accuracy of small arms and relates more particularly to a method and device for readily obtaining the "mean radius" of a group of shots registered on a target.

The accuracy of small arms is preferably measured by determining the mean radius of a group of shots as registered on a target in the form of bullet perforations. Accurate determination of such mean radius normally requires locating the center of impact of the shot group under consideration and then averaging the distances from each shot to this center of impact. Obviously, such procedure is a time consuming and tedious process especially in the case where a large number of firearms are to be targeted.

As a result, attempts have been made to measure the accuracy of firearms by using the "extreme spread" of a shot group as a criterion. Although such procedure materially simplifies the calculations required, it fails to yield the desired accuracy. Another prior art method consists in covering the group pattern of shots on a target with a transparent graduated scale and averaging the readings obtained for each bullet perforation. This method however requires that the center of impact of the group be estimated and therefore introduces a human error depending on the experience and skill of the calculator.

The device of this invention, however, proposes that light rays from a source of light be passed through the bullet perforations on a target and then through a plate of uniformly varying translucency. Such rays are focused by means of a parabolic reflector on a photo-electric cell which registers the total intensity thereof on a suitable calibrated scale from which may be determined the mean radius of the shot group.

Accordingly it is a purpose of this invention to provide a method and apparatus for measuring the accuracy of small arms.

It is a particular purpose of this invention to provide a method and apparatus for determining the mean radius of a shot group on a target in a simple and accurate manner.

The specific nature of the invention as well as other objects and advantages thereof will clearly appear from a description of a preferred embodiment as shown in the accompanying drawings in which:

Fig. 1 is an oblique view of the apparatus of this invention;

Fig. 2 is a fragmentary cross-sectional view taken along the plane 2—2 in Fig. 1;

Fig. 3 is an oblique view of the translucent diffusing plate of this invention showing the manner in which it varies from transparency to opaqueness; and Fig. 4 is a schematic diagram of the electrical circuit.

In Fig. 1 is shown a source of uniform rays of parallel light as indicated by 2, such light being directed at a conventional paper target 3 on which a group pattern of shots 4 is registered. The preferable construction of light source 2 includes a parabolic reflector 16 to insure that the light rays directed at target 3 are uniformly parallel. Target 3 is preferably placed on a desk-like table 5 underneath which a second parabolic reflector 6 is supported and enclosed as by a cylinder 7. Cylinder 7 is of sufficient height to completely shut off photo-electric cell 10 from any light other than that passing through the bullet perforations in target 3. Mounted in table top 8, as shown in Fig. 2, is a light-diffusing plate 9 illustrated particularly well in Fig. 3.

For the purposes of this invention, a comparatively large circular area of plate 9 is so constructed as to be transparent in the geometrical center thereof and vary uniformly in translucency in an outward and radial direction becoming opaque at the outer edges. Such varying translucency may be obtained by photographing successively increased thicknesses of translucent material and using the negative formed thereby, but it should be understood that any suitable method of obtaining the desired characteristics of the diffusing plate of this invention may be employed.

At the focal point of parabolic reflector 6 there is provided a photo-electric cell 10 which is wired to a calibrated indicating meter 11 mounted in a bracket 12 extending upwardly from table top 8. As shown in Fig. 4, a source of potential, such as a battery 13, is connected to an amplifier tube 14 and together with photoelectric cell 10 and meter 11 comprises an electrical circuit. A rheostat 15 is also included in the circuit for varying the starting position of the indicator in meter 11.

The target 3 is preferably placed over plate 9 although for the purposes of this invention it is immaterial in what relation target 3 and plate 9 are placed as long as both are between the light source 2 and the parabolic reflector 6. The focal point of parabolic reflector 6 is axially aligned with the focal point of the parabolic reflector 16 within light source 2 and plate 9 is so positioned that the transparent center thereof is also axially aligned with the focal points of the reflectors. The perforations 4 in target 3 provide openings for light rays to pass through plate 9 and be collected substantially at the focal point of parabolic reflector 6. At this point photoelectric cell 10 measures the total intensity of such light and records such on calibrated meter 11. The target 3 is shifted back and forth over plate 9 until the maximum light reading is registered on calibrated meter 11 and by means of a suitable chart such reading may be converted in terms of inches showing the mean radius of shot pattern 4.

The position of target 3 giving the maximum light reading obviously locates the center of impact of shot pattern 4 with the transparent center of plate 9 as the indicator and assures that the correct procedure in accordance with the definition of "mean radius" is being followed. The farther from the center of impact each perforation in group pattern 4 is located, the less light will pass through plate 9 as previously explained. It can thus be seen that if light meter 11 is inversely calibrated according to the total intensity of light directed at photoelectric cell 10, a true representation of the mean radius of shot pattern 4 will be obtained since the amount of light transmitted through each perforation is inversely proportional to the distance from the imaginary center of impact to such perforation.

It should be understood that any variation in the intensity of light from source 2 may be compensated for by correctly zeroing the apparatus before the operation thereof thus assuring a constant standard of comparison for the various readings obtained for each target. Such zeroing may be accomplished by using a series of targets with known mean radii of the shot patterns therein as standards for comparison and adjusting rheostat 15 to compensate for any variation from the known readings on meter 11.

Thus there is here provided an accurate and simple method of determining the mean radius of a shot group pattern on a target by means of an apparatus which readily lends itself to a rapid production basis.

It is obvious that a like result may be obtained by shading plate 9 so that the center is substantially opaque with increasingly translucent areas radially outward of the center. In this case, the target 3 is adjusted on and relatively to the plate 9 until the reading of meter 11 is a minimum. The meter may then be graduated directly in accordance with the light intensity incident on cell 10, the graduations, if desired, being directly in terms of mean radii of the shot patterns.

In the claims the term "density" means "optical density," that is, the measure of degree of opacity.

We claim:

1. That method of testing the accuracy of fire of a firearm comprising, firing at a target a predetermined plurality of shots from said firearm, to form a shot pattern in said target, varying the amount of light passing from a source of known intensity through said pattern in accordance with the distance from the center of impact of said pattern, and measuring the total light passing through said shot pattern inversely as a criterion of the accuracy of said firearm.

2. That method of testing the accuracy of fire of a firearm, comprising, fixedly mounting said firearm with respect to and aimed at, a target, firing from said firearm a predetermined plurality of shots to form in said target shot holes constituting a shot pattern, projecting light through said shot holes of said pattern, varying the intensity of the light inversely in proportion to the distance from the center of impact of said pattern, and determining the total amount of light projected through said shot holes as a criterion of the accuracy of fire of said firearm.

3. That method of determining the accuracy of small arms consisting of, firing a group of shots at a target, transmitting parallel light rays through the bullet perforations formed in said target by said shots, simultaneously filtering said light rays so as to decrease uniformly in intensity radially outward from the center of said group of shots, simultaneously arranging said target for the transmission therethrough of a maximum intensity of said light rays, and measuring said intensity for comparison thereof with a known standard intensity indicative of the ballistic accuracy of the small arm being tested.

4. The method of determining the mean radius of a group of shots registered on a target as bullet perforations consisting of, transmitting parallel light rays through the bullet perforations, simultaneously filtering said light rays so as to uniformly decrease radially in intensity proportionately as the distance of each bullet perforation from the center of impact of the shot group, simultaneously positioning the target to permit the passage through the bullet perforations of a maximum intensity of the light rays thereby aligning the center of impact of the shot group with the transparent portion of the means for diffusing said light rays, and measuring said maximum intensity in terms of units of measurement adapted to indicate the average of the distances of the bullet perforations from the center of impact of the shot group.

5. An apparatus for measuring the mean radius of a group of shots registered on a target as bullet perforations comprising, a light source producing uniformly parallel light rays, a plate having a circular area varying uniformly from transparency in the center thereof to opaqueness at the outer periphery, said plate being positioned whereby said transparent center thereof is in alignment with said source of light rays and whereby said circular area lies in the path of all of said light rays, said source of light rays and said plate being spaced to permit the insertion of the target therebetween, photoelectric means arranged to respond to the combined intensity of said light rays passing through the target and said plate, and means connected to said photoelectric means for measuring the total intensity of said light rays.

6. In an apparatus for measuring the mean radius of a group of shots registered on a target as bullet perforations, a source of uniformly parallel light rays, a plate having a circular area varying uniformity from transparency in the center thereof to opaqueness at the outer periphery, said plate being positioned whereby said transparent center thereof is in alignment with said source of said light rays and whereby said circular area lies in the path of all of said light rays, said source of said light rays and said plate being spaced apart so as to permit the insertion of the target therebetween, a parabolic reflector having a photoelectric cell at the focal point thereof arranged to receive all of the said light rays passing through the bullet perforations and said plate, and a calibrated light meter wired to said photoelectric cell and arranged to measure the total intensity of said light rays for determining the average of the radial spread of the bullet perforations from a theoretical center of impact.

7. An apparatus for determining the accuracy of small arms from the measurement of the mean radius of a group of shots registered on a target as bullet perforations comprising, in combination, a first parabolic reflector having a source of light rays at the focal point thereof, a second parabolic reflector having a focal point in alignment with said source of light rays, a plate disposed between said first and second reflectors, said plate having a circular area varying uniformly from transparency in the center thereof to opaqueness at the outer periphery, said transparent center being arranged in alignment with said source of light rays whereby said circular area lies in the path of all of said light rays, said first reflector and said plate being spaced to permit the insertion of the target therebetween, a housing enclosing said second reflector against the entry of extraneous light, a photoelectric cell at said focal point of said second reflector adapted to receive all of said light rays passing through the target and said plate, and a calibrated light meter wired to said photoelectric cell for indicating the total intensity of said light rays in terms of units of measurement applicable to indicating the relative accuracy of the small arm from which the group of shots are fired.

JOHN R. CONNELLY.
HERMAN F. HAWTHORNE.

REFERENCES CITED

The following references are of record in the file of this patent:

UNITED STATES PATENTS

| Number | Name | Date |
| --- | --- | --- |
| 1,332,410 | Potts | Mar. 2, 1940 |
| 2,416,919 | Goldsmith | Mar. 4, 1947 |